US005905620A

United States Patent [19]

[11] Patent Number: 5,905,620
[45] Date of Patent: May 18, 1999

Becher et al.

[54] APPARATUS FOR PROTECTING A DEVICE

[75] Inventors: Michael Becher, Althengstett; Edwin Güttinger, Königsbach, both of Germany

[73] Assignee: Thermik Gerätebau GmbH, Pforzheim, Germany

[21] Appl. No.: 09/020,791

[22] Filed: Feb. 6, 1998

[30] Foreign Application Priority Data

Feb. 7, 1997 [DE] Germany .......................... 197 04 563

[51] Int. Cl.[6] ........................................ H02H 5/04

[52] U.S. Cl. .......................... 361/105; 337/89; 337/365; 337/380

[58] Field of Search ........................ 361/26, 105, 23–34, 361/103; 337/89, 343, 365, 379–380, 333–334, 377

[56] References Cited

U.S. PATENT DOCUMENTS 4,816,958 3/1989 Belbel et al. ............................ 361/93
5,023,744 6/1991 Hofsäss ..................................... 361/26
5,615,072 3/1997 Hofsass et al. ........................... 361/24
5,708,553 1/1998 Hung ....................................... 361/103

FOREIGN PATENT DOCUMENTS 1745290 9/1956 Germany .
8806648 8/1989 Germany .

*Primary Examiner*—Jeffrey Gaffin
*Assistant Examiner*—Michael J. Sherry
*Attorney, Agent, or Firm*—Harness, Dickey & Pierce, P.L.C.

[57] ABSTRACT

An apparatus (10) for protecting an electrical device comprises two temperature-dependent switching mechanisms (12, 13) each having at least two temperature-dependent switch conditions, and three external terminals (15, 16, 17). The two switching mechanisms (12, 13) are arranged directly in a common housing (21) in such a way that each switching mechanism (12, 13), as a function of its temperature, connects a first or second external terminal (16, 17), associated with it, directly to a third external terminal, serving as center terminal (15), that is common to both switching mechanisms (12, 13).

13 Claims, 3 Drawing Sheets

APPARATUS FOR PROTECTING A DEVICE

BACKGROUND OF THE INVENTION

1. Field of the Invention

The present invention concerns an apparatus for protecting an electrical device, having two temperature-dependent switching mechanisms each having at least two temperature-dependent switch conditions and at least two external terminals.

2. Related Prior Art

An apparatus of this kind is known from DE-A-42 05 699.

The known apparatus comprises two independent temperature-dependent switches which each have a separate electrically conductive lower housing part. Each lower housing part receives a bimetallic switching mechanism and serves as a first external terminal. The lower housing part is closed off by a cover on which the second external terminal of the respective switch is provided.

The two switches are arranged next to or above one another, a PTC heating block being provided in each case between or below the lower housing parts, resulting in a series circuit made up of the two switches and the heating resistor located therebetween. The two switches and the heating resistor are insulated externally by means of an insulating tube or an outer housing; only the two external terminals provided on the respective cover, and an external terminal constituted by a lower housing part, are accessible from outside.

The switch arranged between the first and the second external terminal is normally closed. The other switch is normally open, the series circuit made up of this switch and the heating resistor being located between the second and third external terminal. The normally closed and normally open switches each have the same switchover temperature.

The known apparatus is used for overtemperature protection of a load in which, in the event of malfunction, there flows a residual current so small that it is not sufficient for the usual self-hold by means of a heating resistor connected in series with the load. In the case of the known apparatus, the normally closed switch is now placed in series with the load, while the series circuit made up of the normally open switch and heating resistor is parallel to the load. In the event of overtemperature of the load, the normally closed switch decouples the load from the voltage supply, while the normally open switch connects the heating resistor to the voltage supply, so that the heat generated in the heating resistor can be used to hold the normally closed and normally open switches in their respective high-temperature settings.

The known apparatus is thus configured for a very specific purpose, the disadvantage here being that two independent switches are used, so that not only are the total dimensions large, but the overall design outlay is also very high, which is associated with corresponding costs.

DE-AS-1 058 606 discloses a temperature-dependent switch, configured as a true changeover switch, which has a temperature-dependent switching mechanism in the form of a bimetallic snap disk. The switch has an electrically conductive housing in which the bimetallic snap disk is guided peripherally. The housing serves as center terminal of the changeover switch. Depending on the temperature, the bimetallic snap disk is in contact, at its center region, with one of two spring-loaded plungers which are held in a manner insulated with respect to the housing, and each constitute one of the two further external terminals.

Depending on the temperature, the bimetallic snap disk creates an electrically conductive connection between the center terminal and one of the two further external terminals. Because of the insulation required between the housing and the two spring-loaded plungers, the known changeover switch is mechanically very complex and bulky. For a number of applications, moreover, the electrically conductive housing must additionally be insulated externally, which requires assembly time and thus results in costs.

As a result of increasingly strict safety regulations and increasingly demanding safety requirements, two or more temperature-dependent switches are often needed for various switching functions in order to protect, in particular, household devices such as washing machines, coffeemakers, clothes dryer, hair dryers, etc. from overheating and overload current. The individual switches must be designed as normally closed or normally open, depending on the requirement; the various switches often must also have different switching temperatures. The apparatus and the changeover switch described above are not suitable for such universal applications; furthermore, their respective complex configuration and the high costs associated therewith are not in line with today's prevailing cost pressure. The size of the known apparatus also precludes use in today's often very small household appliances.

SUMMARY OF THE INVENTION

In view of the above, it is an object of the present invention to provide for an apparatus of the type mentioned at the outset in which a variety of functions can be implemented with small dimensions and a simple, economical construction as well as easy assembly.

According to the invention this object is achieved, in the case of the apparatus mentioned at the outset, by the fact that two switching mechanisms are arranged directly in a common housing in such a way that each switching mechanism, as a function of its temperature, connects a first or second external terminal, associated with it, directly to a center terminal that is common to both switching mechanisms and is preferably designed as a third external terminal.

The object underlying the invention is completely achieved in this fashion.

This is because the inventors of the present application have recognized that two mutually independent switching mechanisms can also be arranged in a common housing, such that each switching mechanism can, as required, be configured as a normally closed or normally open switch. In addition, the two switching mechanisms can have different switching temperatures, which is achieved by the design of the respective bimetallic switching element in the switching mechanism.

In other words, two complete switches are not combined with one another as in the prior art; instead, two switching mechanisms are merely housed in a common housing. In the simplest case, the switching mechanisms can consist of a bimetallic snap disk or a bimetallic switch tongue. The construction of the new apparatus, which comprises only one housing and two switching mechanisms, is extremely simple and has small dimensions. Compared with the use of two separate switches, the reduced material input is advantageous on the one hand because only one housing and three rather than four external terminals are needed. Also associated with the three external terminals is the advantage of simpler wiring, since when the apparatus according to the invention is installed on the device being protected, only three rather than four terminals need to be connected.

If only two external terminals are provided, the center terminal cannot be contacted from outside. This is advisable if the apparatus is intended to conduct only in one temperature range.

One switching mechanism is then normally open, and closes when the lower temperature of the range is reached, while the other switching mechanism is normally closed, and opens at the upper limit of the temperature range, thus once again interrupting the conductive connection between the two external terminals.

The costs for manufacturing the new apparatus are low, and not only because of the small material outlay and the simple construction as compared with the existing art; a further advantage lies in the fact that only one housing needs to be manufactured and populated with switching mechanisms, so that the number of manufacturing steps is also greatly reduced by comparison with the existing art.

It is preferred in general if each switching mechanism comprises a bimetallic snap disk and preferably a spring disk, working against the bimetallic snap disk, which carries a movable contact.

These features are advantageous particularly with regard to manufacture of the new apparatus, since switching mechanisms of this kind, made up of the bimetallic snap disk and optionally spring disk, are simply placed loosely in the associated housing, where they align themselves. Contact to the terminals is made on the one hand via the rim of the spring disk or the bimetallic snap disk, and on the other hand via the movable contact, so that no further attachment actions, such as soldering, etc., are necessary, although they are customary when a bimetallic spring tongue is used.

It is further preferred if the housing is manufactured from insulating material, and if for each switching mechanism, an associated electrode connected to the associated external terminal, and an electrode common to both switching mechanisms, are provided, which is connected to the center terminal; the housing preferably has a receiving space for the first switching mechanism and a receiving space, separated therefrom, for the second switching mechanism, and each receiving space is delimited on the one hand by a common electrode and on the other hand by a respective associated electrode.

This feature is also advantageous in terms of design: for example, two receiving spaces for the switching mechanisms can be provided in the housing, such that the continuous, common electrode extends below the two receiving spaces, while the two receiving spaces are each closed off at the top by their own electrode. In the simplest case, the housing could contain two pass-through bores which are closed off at the bottom by a common sheet-metal part. One switching mechanism is then placed into each bore, the bores then being closed off by sheet-metal parts which are separated from one another and respectively constitute the other two external terminals. This results in an apparatus with small external dimensions.

It should be understood that only very few components and manufacturing steps are necessary to manufacture the new apparatus, so that because of both the small material outlay and the small number of manufacturing steps required, overall a very economical apparatus can be produced, in which, by selecting the particular switching mechanisms that are put in place, it is possible to determine, independently of the overall design and the manufacturing steps, whether normally open or normally closed units are used in each case. The respective switching temperature can also easily be determined by selection of the switching mechanism.

In a development, however, it is preferred if the two receiving spaces are arranged on opposite sides of the common electrode, the two receiving spaces preferably each being closed off by an associated electrode which is configured in each case as a cover and, after the switching mechanism is placed into the receiving space, is attached to one rim of the housing.

This feature is also advantageous in terms of design: only one, so to speak, pass-through bore needs to be provided in the housing, and is then divided into two receiving spaces by means of a metal plate inserted, for example, laterally, the metal plate serving as center terminal. Switching mechanisms are then placed from outside into both the upper and the lower receiving space, whereupon the two receiving spaces are closed off by an upper and lower cover, respectively. A center terminal projecting centrally, and a further respective external terminal at top and bottom, are now provided on the housing, all three external terminals being insulated from one another by the housing in a surprisingly simple manner.

It is preferred in this context if each of the associated electrodes rests on an internal shoulder of the housing, the rim of the housing preferably being hot-pressed or welded after placement of the electrode.

The advantage of these features is on the one hand the easy positioning of the electrode acting as cover, while on the other hand hot-pressing or hot-welding yields much better retention of said cover on the housing than would be the case, for example, with snap lugs. In addition, the rim projecting beyond the electrode electrically insulates the electrode at the top, since the housing rests at its rim on a surface and not on the electrode; on the other hand, the hot-pressing or hot-welding seals the received switching mechanism particularly well against outside influences.

In general, it is preferred if the common electrode is held in lossproof fashion, preferably approximately centeredly in the housing, by encapsulation or injection-embedding during the production of the housing, in such a way that it is an integral component of the housing.

The advantage here is that the housing can now be manufactured, for example, as an injection-molded plastic part, the common electrode being directly injection-embedded during the injection-molding operation so that it becomes an integral component of the housing. In other words, during production of the housing, mounting of the common electrode in the housing is accomplished concurrently, so that several operations can be eliminated thereby. The common electrode can also serve as a support for the housing in order to impart greater stability thereto.

It is further preferred in this context if the common electrode is surrounded on both sides by a part of the housing configured as an inwardly projecting ring, on which, in one switch condition, the bimetallic snap disk and/or the spring disk are braced with their respective rims, the bimetallic snap disk and/or spring disk preferably being braced with their rims, in the other switch condition, against the associated electrode.

This feature is also advantageous in terms of design, since the ring performs two functions: on the one hand it retains the common electrode, and on the other hand it serves as an insulating support surface for the rim of the bimetallic snap disk and/or spring disk in one of its switch conditions. In the other switch condition the spring disk, for example, is braced internally at its rim against the associated electrode, while it presses the movable contact against the common electrode so that an electrical connection is made between the common electrode and associated electrode. When the temperature then rises, the bimetallic snap disk slipped over the movable contact then snaps over and braces itself at its rim against the projecting ring; with its middle region it pushes the counter-contact, against the force of the spring disk, away from the common electrode so that the electrical circuit is interrupted. Of course the switching mechanism could also be put in place in reverse, so that in order to close the electrical circuit the bimetallic snap disk, for example, which is all that is provided, braces with its rim against the common electrode and presses the movable contact, now carried by it, against the associated electrode. When the bimetallic snap disk then kicks over, it comes into contact with its rim against the associated electrode, so that an insulating contact surface is now necessary in this region so that the electrical contact is not closed again by way of the movable contact which is now pressed against the common electrode. This insulating contact surface could, for example, be constituted by an insulating disk provided on the interior of the associated electrode, although here again a projecting ring of the housing can serve as the insulating contact surface. The variant in which the ring, provided in any case to retain the common electrode, serves as the insulating contact surface is, however, preferred; all that is necessary for this is for the bimetallic switching mechanism to be placed, so to speak, upside down into the receiving space.

It is further preferred if the common electrode has a shaped-on extension, projecting out of the housing, which serves as the center terminal, each associated electrode preferably having a shaped-on extension projecting laterally beyond the housing, which serves as the external terminal, each electrode furthermore preferably being a stamped sheet-metal part, shaped like a disk, on which the extension is integrally configured.

This feature is also advantageous in terms of design: because of the attachment of the center electrode and the two external electrodes, the result of the respective extension is, so to speak, to configure the external terminal as well in the same operation. This extension can be configured as a solder lug, cable connection shoe, etc. If stamped sheet-metal parts are used for this, the manufacturing costs are very low, so that this also contributes further to reducing the manufacturing and production costs of the new apparatus.

Further features and advantages are evident from the description and the attached drawings.

It is understood that the features mentioned above and those yet to be explained below can be used not only in the respective combinations indicated, but also in other combinations or in isolation, without leaving the context of the present invention.

BRIEF DESCRIPTION OF THE DRAWING

An embodiment of the invention is depicted in the attached drawings and will be explained in more detail in the description below. In the drawings.

DESCRIPTION OF THE PREFERRED EMBODIMENT

Figure 1:
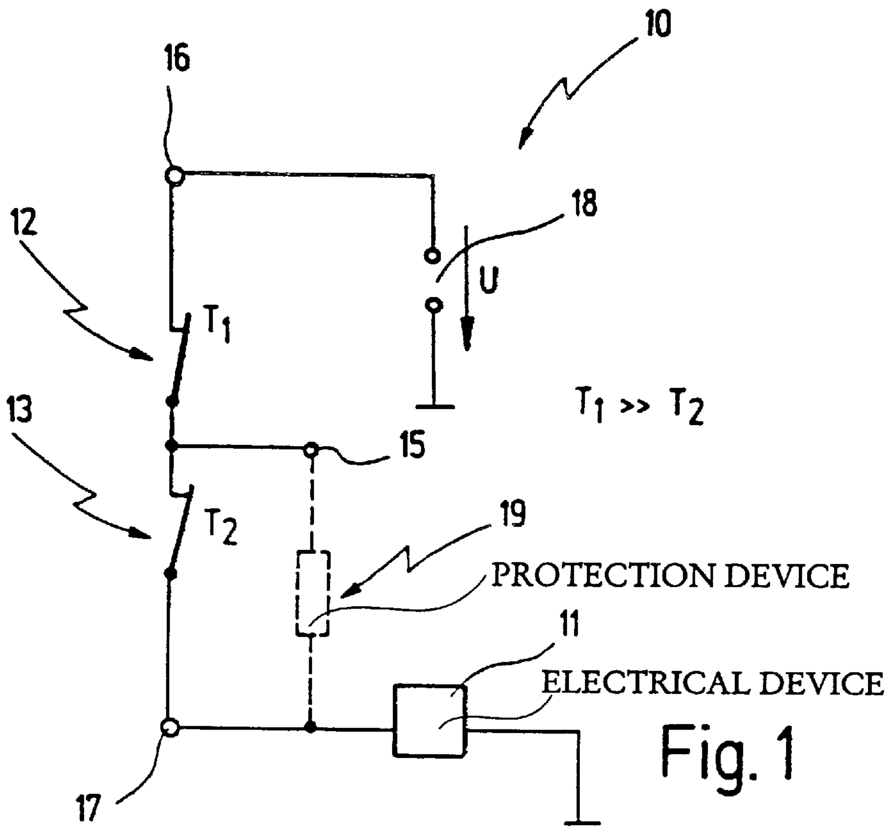
FIGS. 1 and 2 show exemplifying applications of the new apparatus to the protection of electrical loads.

In FIG. 1, 10 schematically shows a new apparatus for protecting an electrical device indicated at 11. Apparatus 10 comprises a first temperature-dependent switching mechanism 12 as well as a second temperature-dependent switching mechanism 13 that is connected in series with first temperature-dependent switching mechanism 12.

Reference numeral 15 indicates a center terminal common to both switching mechanisms 12 and 13, while 16 designates a first external terminal associated with first switching mechanism 12, and 17 an indicated second external terminal. Both switching mechanisms 12, 13 are configured to be normally closed, such that switching mechanism 12 switches at a temperature $T_1$ which is very much higher than temperature $T_2$ at which second switching mechanism 13 opens.

The series circuit made up of the two switching mechanisms 12, 13 is connected via external terminal 16 to a supply voltage 18, while device 11 to be protected is connected between second external terminal 17 and ground. A protective device 19, which can be, for example, a heating resistor, a current limiter circuit, etc., is connected between center terminal 15 and second external terminal 17.

When the temperature of device 11 being protected rises to a temperature above $T_2$, switching mechanism 13 opens and the power supplied directly to device 11 by supply voltage 18 is interrupted. Device 11 now, however, obtains its supply power via protective device 19, which can ensure, for example, that only a maximum allowable current flows. If protective device 19 is configured as a heating resistor, it can, for example, perform a self-hold function, i.e. can, by means of the ohmic heat generated, keep the temperature in the interior of apparatus 10 high enough that switching mechanism 13 cannot close again. The resistor can also be dimensioned in such a way that apparatus 10 cools down very slowly, thus implementing a certain activation delay for switching mechanism 13.

If apparatus 19 can be omitted, no center terminal 15 is necessary. Device 11 is then switched off when temperature $T_2$ is exceeded, and switched back on when the temperature drops below $T_2$.

If the temperature should, however, rise higher than $T_1$, switching mechanism 12 then opens so that the power supply to device 11 is finally interrupted. Switching mechanism 12 can be designed so that it closes again only at temperatures well below room temperature, which can be achieved by way of a corresponding switching hysteresis of the temperature-determining bimetallic switching element.

The arrangement shown in FIG. 1 thus ensures that when a temperature $T_2$ is reached, device 11 is protected from excessive power input or the like, or is switched off, but can switch back on after a certain activation delay, as is known, for example, from electric hair dryers. Only if a damaging temperature $T_1$ is exceeded does the new apparatus 10 completely interrupt power to device 11. External actions, for example the use of a cold spray, are then necessary in order to render apparatus 10 operational once again.

Figure 2:
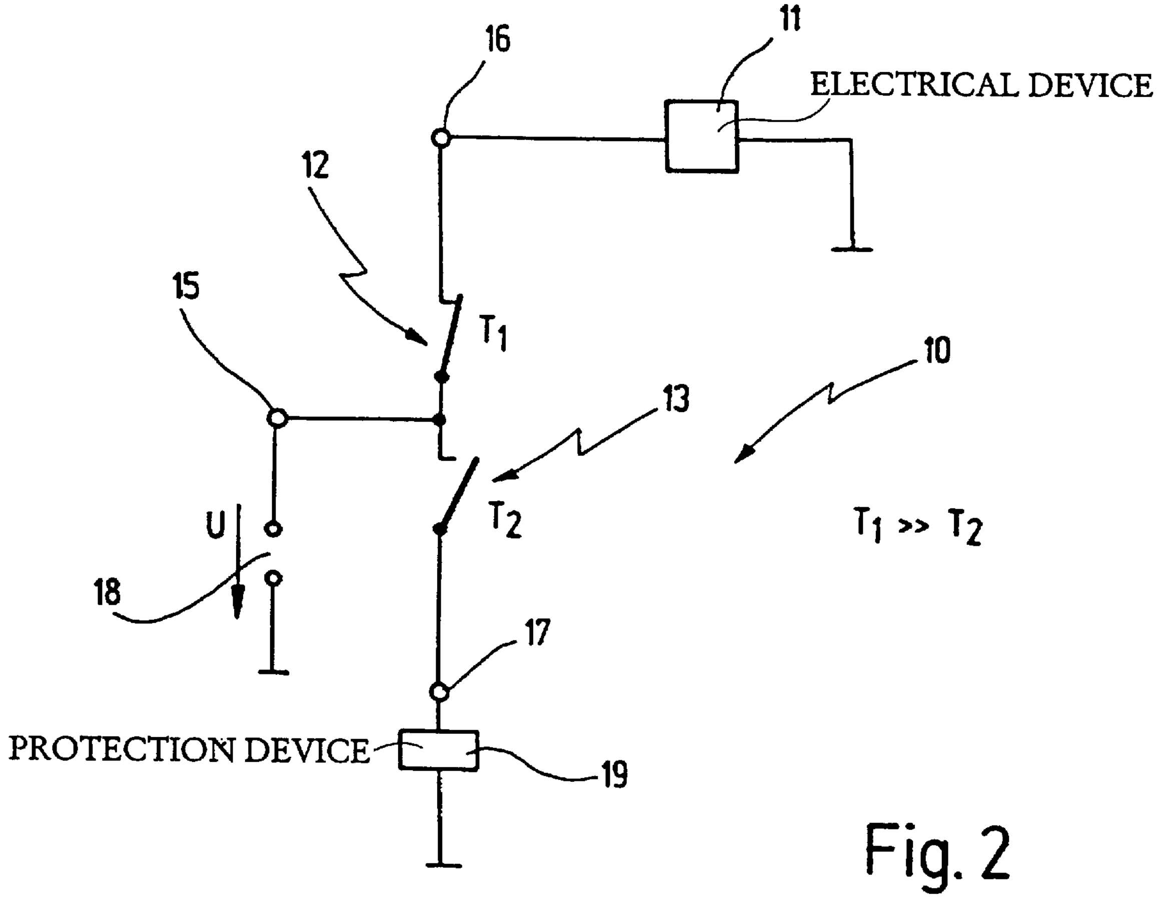

FIG. 2 also shows the new apparatus 10 which protects a device 11 which now, however, is connected to first external terminal 16, while supply voltage is conveyed via center terminal 15. Protective device 19 is now connected between second external terminal 17 and ground. While switching mechanism 12 is once again configured as normally closed with a response temperature $T_1$, switching mechanism 13 is now normally open, with a response temperature $T_2$ which is much lower than response temperature $T_1$.

When device 11 being protected reaches a temperature greater than $T_2$, switching mechanism 13 actuates protective device 19, which can be, for example, a fan which cools device 11. If the temperature of device 11 should nevertheless rise further and ultimately exceed the value $T_1$, switching mechanism 12 then opens, and the connection between device 11 and supply voltage 18 is interrupted. Here again, the switching hysteresis of switching mechanism 12 can be selected so that it does not close again at room temperature.

It is evident from FIGS. 1 and 2 that switching mechanisms 12 and 13 perform functions which are entirely independent of one another in order to protect device 11, although it is possible, by means of the type of wiring selected, to combine two terminals of switching mechanisms 12, 13 into a common center terminal 15 without thereby limiting the universal applicability of the new apparatus 10. It should also be noted that the two switching mechanisms 12, 13 can be designed, independently of one another, to be normally closed or normally open; the switching temperatures of the two switching mechanisms 12, 13 can also be set independently of one another.

Figure 3:
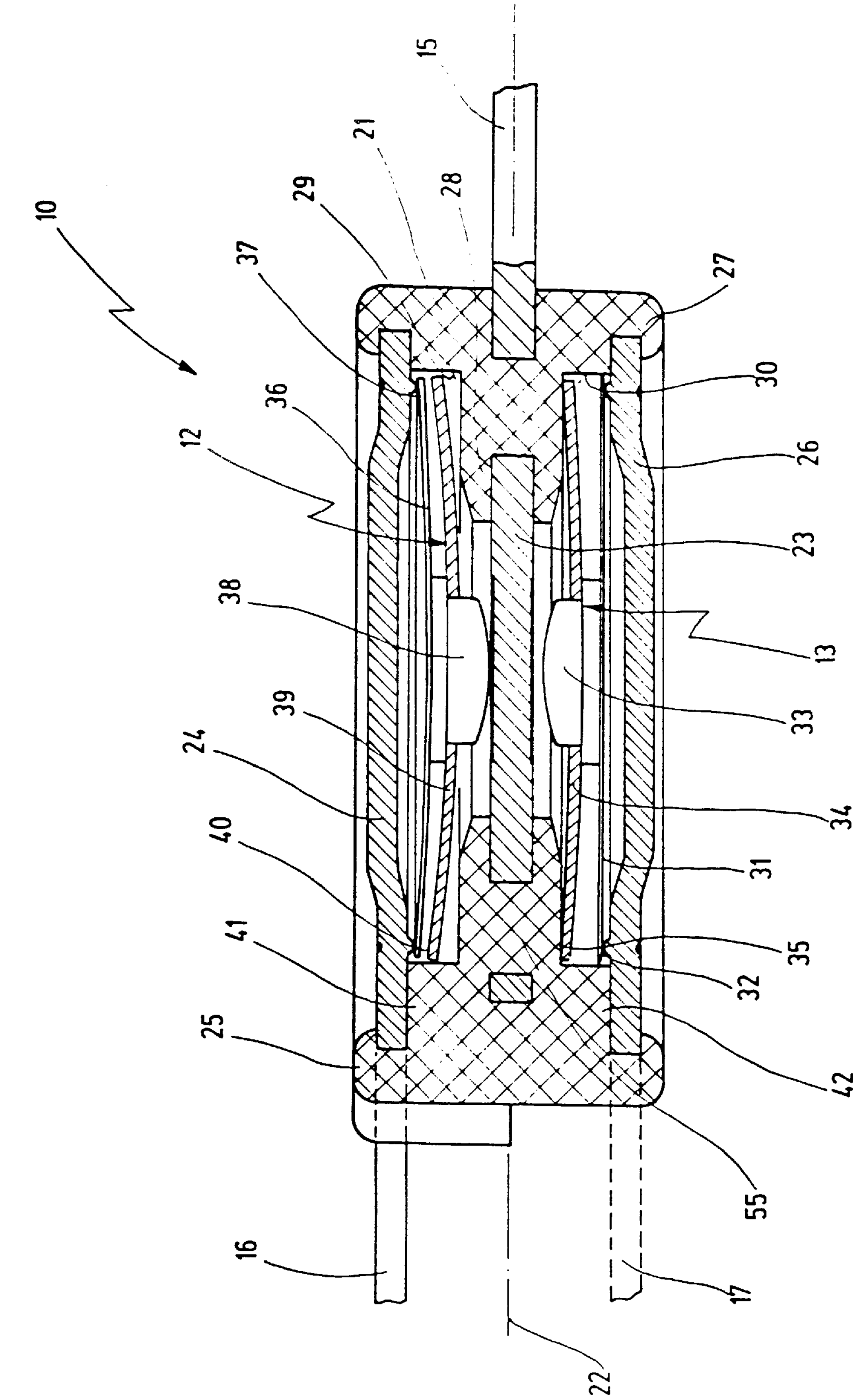
FIG. 3 shows a longitudinal section through the new apparatus along line III—III of FIG. 4.

An embodiment of the new apparatus 10 is shown in section in FIG. 3. Apparatus 10 comprises first of all a housing 21 made of insulating material, in whose plane of mirror symmetry (indicated at 22) an injection-embedded electrode 23, associated with center terminal 15, is provided. Housing 21 is closed off at the top by a top cover electrode 24 which is associated with first external terminal 16 and is held by a projecting rim 25 of housing 21 which has been deformed by hot-pressing or hot-welding.

Housing 21 is closed off at the bottom by a lower cover electrode 26 which is associated with second external terminal 17 and is held in corresponding fashion by a rim 27.

Injection-embedded electrode 23 is held by an inwardly projecting ring 28 which is configured integrally with housing 21 and divides a bore, passing through housing 21, into an upper receiving space 29 for switching mechanism 12 and a lower receiving space 30 for switching mechanism 13.

Switching mechanism 13 comprises a spring disk 31 which, in the switch condition shown, is braced with its rim 32 against the inside of lower cover electrode 26, and carries a movable contact 33 which is pushed away from injection-embedded electrode 23 by a bimetallic snap disk 34 which is braced at its rim 35 against ring 28.

In the same fashion, switching mechanism 12 comprises a spring disk 36 which is braced at its rim 37 against the inside of upper cover electrode 24 and carries a movable contact 38 which it presses against injection-embedded electrode 23. A bimetallic snap disk 39, whose rim 40 is unloaded in the switch condition shown, is slipped over contact 38.

It is further evident that upper cover electrode 24 rests on an internal peripheral shoulder 31 of housing 21, while lower cover electrode 26 rests on a corresponding shoulder 42 onto which it is pressed by rim 27. Apparatus 10 is hermetically sealed by means of peripheral rims 25 and 27, so that neither dirt nor moisture can penetrate into receiving spaces 29 and 30.

In the switch condition shown, center terminal 15 is connected by way of spring disk 36 to first external terminal 16, while no electrically conductive connection is present between center terminal 15 and second external terminal 27, since bimetallic snap disk 34 is pushing movable contact 36 away from injection-embedded electrode 34 because it is in its high-temperature position. If the temperature rose further, bimetallic snap disk 39 would also kick over from the convex shape shown into a concave shape, thereby pushing movable contact 38 away from injection-embedded electrode 23, for which purpose it would be braced with its rim 40 on ring 28 so as to be insulated with respect to electrode 23.

The apparatus shown in FIG. 3 thus comprises two switching mechanisms 12, 13 acting as normally closed switches, and thus corresponds to the apparatus shown in FIG. 1, the prevailing temperature being greater than $T_2$ and less than $T_1$.

On the other hand it is also possible, in the position shown in FIG. 3, for bimetallic snap disk 34 still to be in its low-temperature position, so that switching mechanism 13 is configured as normally open. In this case, apparatus 10 of FIG. 3 would correspond to the configuration shown in FIG. 2 at a temperature below $T_2$.

It is immediately apparent that by selecting the properties of bimetallic snap disks 34, 39 it is possible to determine both the respective switching temperatures and the switching behavior of the respective switching mechanism 12, 13, i.e. their temperature-dependent switch conditions.

Figure 4:
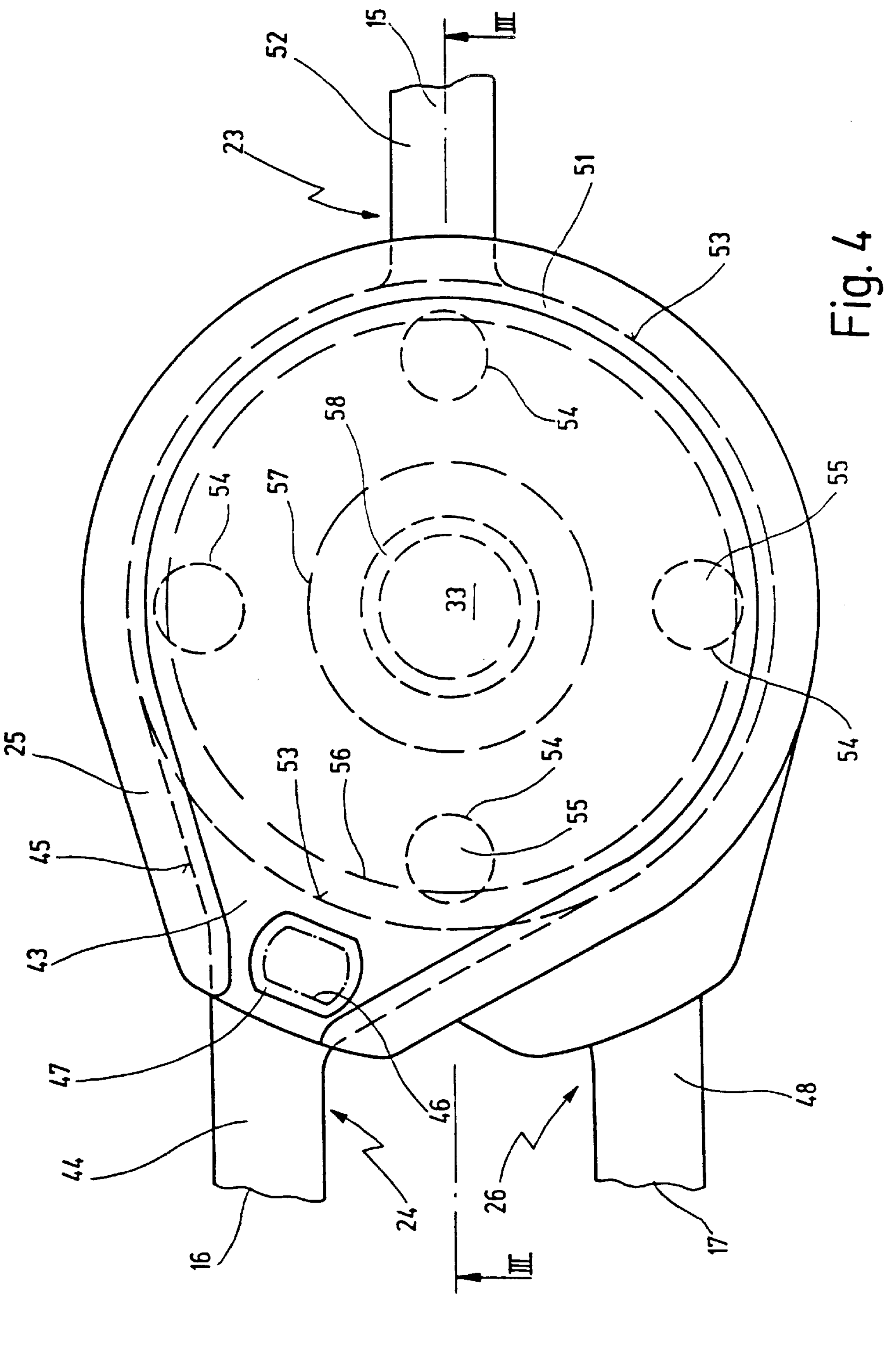
FIG. 4 shows a plan view of the apparatus of FIG. 3.

FIG. 4 shows a plan view of the new apparatus 10, from which it is evident that cover electrode 24 is configured as disk 43 which has an integrally shaped-on extension 44 which serves as first external terminal 16. The outline of disk 43 is indicated at 45. An opening 46, through which a rivet-like projection 47 extends in the manner of a snap lug, is provided in disk 43.

Also visible lower down in FIG. 4 is an extension 48 which is configured integrally with lower cover electrode 26, which is otherwise not visible in FIG. 4.

Injection-embedded electrode 23 is also configured as disk 51 with an extension 52 which serves as center terminal 15. The outline of disk 51, which partially coincides with outline 45, is indicated at 53.

Visible in disk 51 are a total of four openings 54 through each of which extend tabs 55 which are also indicated in FIG. 3.

Also indicated at 56 is the stepped bore which constitutes receiving space 29 for switching mechanism 12, the inner rim of ring 28 being visible at 57. Also indicated in the interior is movable contact 33, which is equipped with a collar 58.

It should also be noted that the section depicted in FIG. 3 is taken along line III—III of FIG. 4, so that for better comprehension, extension 48 is shown with dashed lines in FIG. 3.

In the manufacture of the apparatus described so far, injection-embedded electrode 23 and the two cover electrodes 24, 26 are first punched out, integrally with their extensions 52 and 44, 48, from sheet metal, being simultaneously brought into the shape shown.

Housing 21 is then injection-molded around electrode 23, so that injection-embedded electrode 23 becomes an integral component of housing 21 but at the same time can be contacted from outside by means of extension 52.

The two switching mechanisms 12, 13 are then placed, so to speak, upside down into receiving spaces 29, 30, so that they face injection-embedded electrode 23 with their respective movable contacts 33, 38. Cover electrodes 24, 26 are then put on, being aligned by their respective projection 47 and still-elevated rims 25 and 27. Rims 25 and 27 are then hot-pressed or hot-welded, thus completing manufacture.

It is evident that very few components and an extremely small number of manufacturing steps are needed to produce the new apparatus 10, which nevertheless comprises two switching mechanisms 12, 13 which can be configured and used independently of one another, and exhibits a very small overall height of approximately 4.5 mm.

Therefore, what I claim, is:

1. An apparatus for protecting an electrical device, comprising:

a common housing manufactured from insulating material;

first external, second external, and common terminals arranged on said common housing;

a first temperature-dependent switching mechanism arranged within said common housing and comprising a first electrode connected to the first external terminal; and a second temperature-dependent switching mechanism arranged within said common housing and comprising a second electrode connected to the second external terminal;

a common third electrode being associated and common to said first and second switching mechanisms and connected to said common terminal;

said first switching mechanism, as a function of its temperature, connecting said first external terminal electrically to said common terminal; and said second switching mechanism, as a function of its temperature, connecting said second external terminal electrically to said common terminal, wherein the common housing has a receiving space for the first switching mechanism and a receiving space, separated therefrom, for the second switching mechanism, each receiving space being delimited on the one hand by said common third electrode and on the other hand by said first and second electrode, respectively.

2. An apparatus as in claim 1, wherein each switching mechanism comprises a bimetallic snap disk.

3. An apparatus as in claim 2, wherein each switching mechanism comprises a spring disk working against the bimetallic snap disk and carrying a movable contact.

4. An apparatus as in claim 1, wherein the two receiving spaces are arranged on opposite sides of the common third electrode.

5. An apparatus as in claim 1, wherein the two receiving spaces are each closed off by its first and second electrode, respectively, which is each configured as a cover and, after the switching mechanism is placed into the receiving space, has been attached to one rim of the housing.

6. An apparatus as in claim 5, wherein the first and second electrodes each rests on an internal shoulder of the housing.

7. An apparatus as in claim 5, wherein the rim has been hot-pressed or hot-welded after placement of the first and second electrodes.

8. An apparatus as in claim 1, wherein the common third electrode is held in lossproof fashion in the housing, by encapsulation or injection-embedding during the production of the housing, in such a way that it is an integral component of the housing.

9. An apparatus as in claim 8, wherein the common third electrode is surrounded on both sides by a part of the common housing configured as an inwardly projecting ring on which the bimetallic snap disk and/or the spring disk are braced with their respective rims, when being in one switch condition.

10. An apparatus as in claim 9, wherein the bimetallic snap disk and/or spring disk are braced with their rims against the first and/or second electrodes, when being in a second switch position.

11. An apparatus for protecting an electrical device, comprising:

a common housing manufactured from insulating material;

first external, second external, and common terminals arranged on said common housing;

a first temperature-dependent switching mechanism arranged within said common housing and comprising a first electrode connected to the first external terminal; and a second temperature-dependent switching mechanism arranged within said common housing and comprising a second electrode connected to the second external terminal;

a common third electrode being associated and common to said first and second switching mechanisms and connected to said common terminal;

said first switching mechanism, as a function of its temperature, connecting said first external terminal electrically to said common terminal; and said second switching mechanism, as a function of its temperature, connecting said second external terminal electrically to said common terminal, the common third electrode is held in lossproof fashion in the housing, by encapsulation or injection-embedding during the production of the housing, in such a way that it is an integral component of the housing, and the common third electrode has a shaped-on extension, projecting out of the common housing, which is the common terminal.

12. An apparatus as in claim 11, wherein said first and second electrodes each have a shaped-on extension projecting laterally beyond the housing and being the first and second external terminal, respectively.

13. An apparatus as in claim 11, wherein said first and second electrodes each are a stamped sheet-metal part, shaped like a disk, on which the respective extension is integrally configured.

* * * * *